United States Patent
Kaufner

(10) Patent No.: US 10,352,957 B2
(45) Date of Patent: Jul. 16, 2019

(54) METHOD FOR GENERATING A SPEED SIGNAL OF AN ELECTRIC MOTOR

(71) Applicant: Schaeffler Technologies AG & Co. KG, Herzogenaurach (DE)

(72) Inventor: Benjamin Kaufner, Stegaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 112 days.

(21) Appl. No.: 15/563,106

(22) PCT Filed: Jan. 27, 2016

(86) PCT No.: PCT/DE2016/200050
§ 371 (c)(1),
(2) Date: Sep. 29, 2017

(87) PCT Pub. No.: WO2016/155713
PCT Pub. Date: Oct. 6, 2016

(65) Prior Publication Data
US 2018/0088145 A1 Mar. 29, 2018

(30) Foreign Application Priority Data
Mar. 31, 2015 (DE) .................. 10 2015 205 772

(51) Int. Cl.
*G01P 3/487* (2006.01)
*G01P 3/48* (2006.01)
*G01P 3/489* (2006.01)

(52) U.S. Cl.
CPC .............. *G01P 3/487* (2013.01); *G01P 3/48* (2013.01); *G01P 3/489* (2013.01)

(58) Field of Classification Search
CPC ......... G01P 3/487; G01P 3/488; G01R 31/34; G01R 31/343; G01R 31/346
See application file for complete search history.

(56) References Cited

U.S. PATENT DOCUMENTS 4,481,786 A * 11/1984 Bashark ............ G01R 31/2825
                                                318/438
6,069,467 A * 5/2000 Jansen ................ H02P 6/183
                                                318/801

(Continued)

FOREIGN PATENT DOCUMENTS

DE       4019001        12/1991
DE      102 60 862 A1    7/2004

(Continued)

OTHER PUBLICATIONS

International Search Report of PCT/DE2016/200050, 2 pages, dated May 13, 2016.

*Primary Examiner* — Tung X Nguyen
(74) *Attorney, Agent, or Firm* — Davidson, Davidson & Kappel, LLC

(57) ABSTRACT

A method for the improved speed determination of electric motors while taking into account angle errors of an angular position sensor is provided. A commutation sensor based on a magnetic rotary encoder, the angle signal of which has an angle-dependent and thus periodic angle error, is used. By differentiation, this defective angle signal is converted into a raw speed signal, which has two disturbance components. One disturbance component results from the angle error and is the disturbance waviness, which is periodic similar to the angle error. The second disturbance component is formed by a noise component superposing the raw speed signal. In order to correct the defective raw speed signal, half of the period duration of the raw speed signal must be ascertained. If this half of the period duration is ascertained two samples of the raw speed signal lying exactly one half of the period duration of the raw speed signal apart from each other are (Continued)

averaged. A speed signal having no disturbance waviness but rather only the noise component results from these method steps.

9 Claims, 4 Drawing Sheets

(56) References Cited

U.S. PATENT DOCUMENTS

2004/0153780 A1 8/2004 Strohrmann et al.
2007/0043528 A1 2/2007 Bae et al.

FOREIGN PATENT DOCUMENTS

DE 101 33 524 A1 8/2004
DE 10 2011 105 502 A1 1/2012

* cited by examiner

METHOD FOR GENERATING A SPEED SIGNAL OF AN ELECTRIC MOTOR

The present invention relates to a method for generating a speed signal, which is suitable for the improved speed determination of a rotatory electric motor. The improvement in the extraction of a signal representing the speed of the electric motor is achieved by taking into account the application-specific error form. In this case, a speed signal ascertained by a commutation sensor is corrected by a sample average. The speed of the electric motor may be an angular speed or a rotational speed. The present invention also relates to an electric motor system in which the above-named method is used.

BACKGROUND

An accurate speed signal is required wherever electric motors are used for a drive whose regulation is to be carried out more precisely than using a conventional block commutation. The speed signal may be ascertained using an angle signal, which may be detected by a commutation sensor. However, the angle signal and thus also the speed signal may have disturbances which prevent precise regulation of the electric motor. In the prior art, for example, approaches are described for correcting the disturbances with the aid of a previously ascertained correction value.

DE 102 60 862 A1 shows a method for correcting an angle- and/or distance-measuring sensor system, in which sinusoidal or cosinusoidal measuring signals are evaluated, which are obtained by scanning a moved measuring object. The correction of the angle or phase errors of the measuring signals takes place by deriving constants from a plurality of measuring signals for estimating and correcting the angle error or phase error and/or the amplitude of the measuring signals.

DE 101 33 524 A1 describes a method for correcting a dynamic error of a sensor. This dynamic error superposes the sensor signal, for example, in the form of periodic fluctuations, the frequency and amplitude of which continuously change with the speed of the motor. In order to correct the dynamic error, the sensor output signal is fed to a filter circuit and a correction circuit. The correction circuit receives one or multiple filtered signals delivered by the filter circuit and generates a corrected sensor signal from information it obtains by comparing the filtered signals with the unfiltered sensor output signal or corrected signals derived therefrom.

DE 10 2011 105 502 A1 shows a method for balancing a phase offset between a rotor position sensor and a rotor position of an electrically commutated motor. In this case, the rotor position sensor measures a position of the rotor of the motor, which is activated during operation using a block commutation. The measured position is compared with an expected position. A phase offset is formed from the difference between the measured and the expected position, which is used for activating the electrically commutated motor. The position of the rotor is measured using an absolute value rotor position sensor, which is compared with a motor parameter which characterizes the expected position of the rotor.

US 2007/0043528 A1 shows a method and system for measuring a speed of a high-speed motor, a rotor period being calculated from the rotor speed of the motor or from a filtered speed of the motor and a number of points being calculated from it in a sliding average value.

SUMMARY OF THE INVENTION

It is an object of the present invention to provide a method for generating a speed signal of an electric motor, by which signal disturbances are corrected, so that the generated speed signal better reflects the actual speed of the electric motor.

The method according to the present invention is suitable for use on electric motors, for which very precise regulation is necessary. Here, a speed signal is required, which is permanently ascertained exactly, including during a rotation of the rotor of the electric motor.

A commutation sensor based on a magnetic rotary encoder may be used as the signal generator, which ascertains an angle signal on the electric motor from which the speed signal may be obtained. The angle signal ascertained by the commutation sensor has disturbance components, at least in the form of a noise component and an angle error. The noise component of the angle signal of the commutation sensor occurs due to disturbances in signal transmission. The angle error is based on system- or application-specific error characteristics of the commutation sensor. The angle error is angle-dependent and consequently occurs periodically. The period duration of the angle error depends on the type of the commutation sensor, on which the period duration of the angle signal is also dependent. The period duration of the angle signal and the period duration of the angle error are thus directly related to one another.

In a first step of the method according to the present invention, an angle signal of the electric motor is ascertained with the aid of a commutation sensor, which is preferably based on a magnetic rotary encoder. The rotary encoder may, for example, be equipped with multiple Hall effect sensors, the poles of which are assigned to a magnet wheel fixedly connected to the rotor of the electric motor. The angle signal measured by such a commutation sensor necessarily has disturbance components in the form of a noise component and an angle error. The angle error is angle-dependent and, as a function of the speed of the electric motor, repeats itself in each rotation in the same form, since it is based on system- or application-specific error characteristics of the commutation sensor. Consequently, the angle error is periodic. The period duration of the angle error depends on the type of the commutation sensor. Both the period duration of the angle signal and the period duration of the angle error may be ascertained as soon as a plurality of rotations of the electric motor have been carried out.

In a next step, the angle signal is converted into a raw speed signal by differentiation. By the derivation of the measured angle after time, the angle error which is still relatively small in the angle signal increases and causes an intensified error of the raw speed signal, which is also referred to as disturbance waviness due to its periodicity. The shape of the angle error of the angle signal and thus also the shape of the disturbance waviness of the raw speed signal is repeated periodically with respect to an ideal value with each magnetic pole pair of the commutation sensor. The shape of the angle error and the disturbance waviness is furthermore characterized by a point symmetry which occurs due to the fact that the angle signal oscillates around the ideal value, similar to a sinusoidal disturbance signal on the angle signal. The period duration of the speed signal, which is periodized by the disturbance waviness, depends on the type of the commutation sensor and on its system- and application-specific error characteristics.

Depending on the type of commutation sensor used, the commutation sensor detects one or two periods of the angle signal for each complete rotation of the electric motor.

In another step of the method, half the period duration of the speed signal is ascertained. For this purpose, the motor must have carried out at least half a rotation, since half the period duration is ascertained from the samples measured by the commutation sensor and is not predetermined. Since the samples and thus also half the period duration of the raw speed signal may change continuously by changes in speed, half the period duration is preferably ascertained continuously during the operation of the electric motor. It is simplified, but also possible, to determine the period duration only at each step of the angle signal from $+\pi$ to $-\pi$. Other methods may also be used for determining the correct distance between the two sample sets, for example, by feeding back the calculated speed signal.

In a next step, at least two samples of the raw speed signal are averaged, which lie exactly one half of a period length apart from one another. These samples represent the values sampled by the commutation sensor. Two or more samples, each of which has a distance of exactly half a period length of the speed signal, must be selected in order to correct the disturbance waviness of the speed signal. Preferably, the most recent of the at least two selected samples is the most recent of the samples provided. Due to the periodicity and the point symmetry of the disturbance waviness of the raw speed signal, in each case two samples are basically sufficient for the averaging of the raw speed signal, so that the signal after the averaging no longer has any disturbance waviness but instead only contains the noise component. This formed mean value is then provided as a speed signal of the motor. The averaging of the samples is carried out, for example, in a conventional manner by addition of the two speed values of the samples and division by the number of the added samples.

One particular advantage of the method according to the present invention is that a very good correction of the speed signal takes place, since the disturbance waviness is completely eliminated and initially only the noise component remains, which may be filtered out in further steps. A further advantage results from the fact that the speed-dependent averaging does not require a full period of the disturbance signal.

Since the method according to the present invention is preferably intended to provide a continuous speed signal for the entire operation of the electric motor, the above-named method steps are also carried out continuously one after the other at each point in time at which the commutation sensor delivers a sample, as soon as the electric motor has carried out a first half rotation.

In one preferred specific embodiment of the method according to the present invention, a commutation sensor is used for ascertaining the angle signal which detects one period of the angle signal and two periods of the angle error per complete rotation of the electric motor.

In particularly preferred specific embodiments of the method according to the present invention, the commutation sensor detects an angle signal having an angle error, whose period duration is twice as long as that of the angle signal. The angle error consequently includes two full periods per rotation of the electric motor.

In preferred specific embodiments of the method according to the present invention, the half-period duration of the raw speed signal is ascertained by ascertaining the duration between two value range steps of the angle signal. The value range steps preferably occur after a complete rotation of the electric motor, particularly preferably when the angle signal steps from $+\pi$ to $-\pi$ or vice versa. This duration is the period duration of the angle signal and preferably the duration for one rotation of the electric motor, since exactly $2\pi$, i.e., one rotation, lies between two steps from $+\pi$ to $-\pi$. Since the period duration of the angle signal is preferably half as long as that of the angle error and accordingly the disturbance waviness of the raw speed signal, the ascertained period duration of the angle signal must be quartered to obtain half the period duration of the raw speed signal.

In an alternative preferred embodiment of the method according to the present invention, the half-period duration of the raw speed signal is ascertained by feeding back the ascertained and corrected speed signal. Since no corrected speed signal is yet available at the start of the method, the previously ascertained and not yet corrected raw speed signal must be used in the first pass of the method steps according to the present invention in order to ascertain half the period duration. The corrected values of the speed signal are used in all subsequent passes of the method steps in order to ascertain half the period duration of the raw speed signal. The raw speed signal of the electric motor reflects values in the form of rotation numbers. Consequently, half the period duration may be calculated from half the reciprocal of the number of rotations.

In preferred embodiments, more than two samples of the raw speed signal are averaged to correct the raw speed signal. Here, two average values are averaged over n samples each, which have a distance of exactly half the period duration of the raw speed signal, where n>1. Another possibility is to average all samples of n pairs in one step, the particular samples of the pairs lying exactly one half of a period duration of the raw speed signal apart from one another. One particular advantage of this preferred embodiment is that not only the disturbance waviness but also the noise component of the raw speed signal may be corrected. For this purpose, preferably n>5 pairs of samples are selected, 5<n<50 pairs being preferred in particular, the first samples of the pairs and the second samples of the pairs immediately following one another in each case. The most recent of the provided samples are preferably the samples of the pairs, which are more recent with respect to time.

Using the method according to the present invention, an improved speed-regulatable electric motor system may be designed, which may be used, for example, for driving electric vehicles.

BRIEF DESCRIPTION OF THE DRAWINGS

Additional details, advantages and refinements of the present invention are derived from the following description of preferred specific embodiments of the present invention with reference to the drawings.

DETAILED DESCRIPTION

Figure 1:
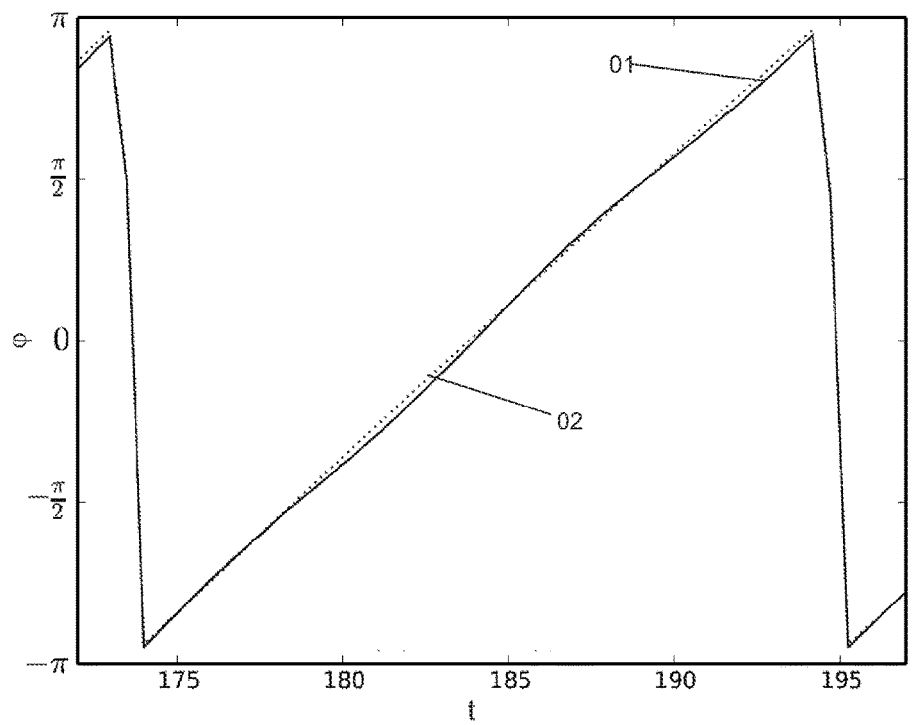
FIG. 1 shows a diagram which depicts the ideal angle signal and the angle signal measured by the commutation sensor.

FIG. 1 shows the curve of an angle signal 01, measured by the commutation sensor, which shows the magnetic field angle as a function of time and shown as a continuous line. In contrast, ideal angle signal 02 is shown as a dashed line. For each rotation from $-\pi$ to $+\pi$, angle signal 01 scans a full period. The comparison of ideal angle signal curve 02 with measured angle signal curve 01 shows that the commutation sensor records a slight angle error 03 which oscillates around ideal signal curve 02 on the angle signal similar to a sinusoidal disturbance signal.

Figure 2:
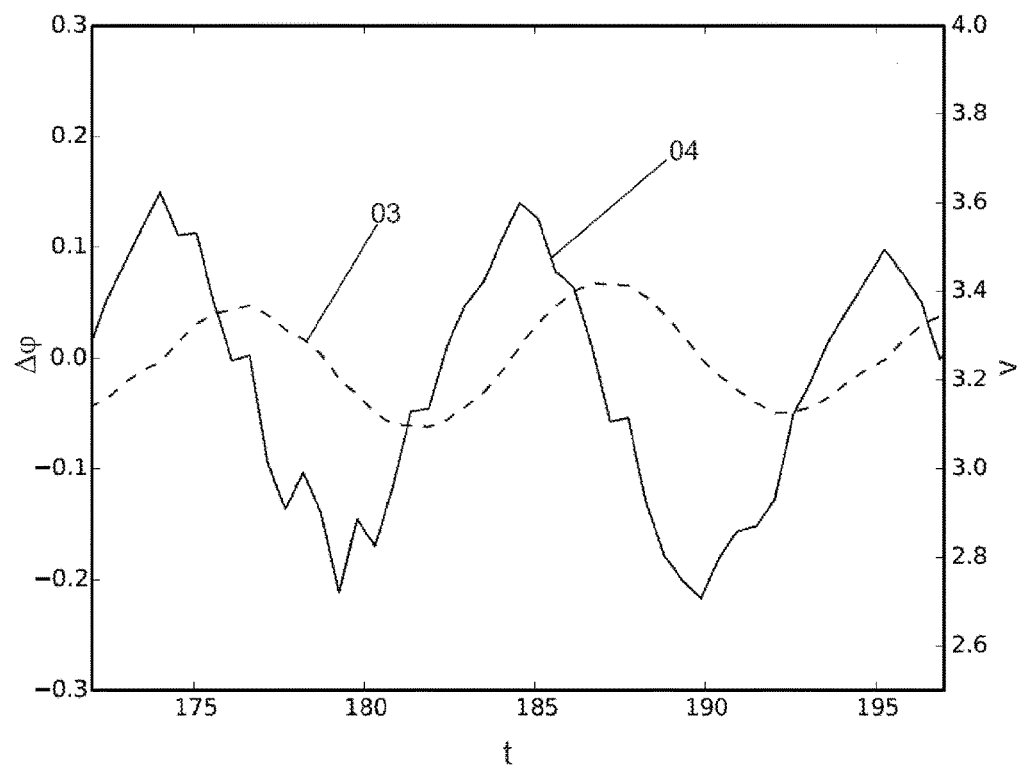
FIG. 2 shows a diagram including the raw speed signal curve and the curve of the angle error on the commutation sensor.

FIG. 2 shows this angle error 03 as a magnetic field angle difference as a function of time, as well as raw speed signal 04, which is obtained by differentiating angle signal 01. It is apparent here that the waviness apparent in the curve of angle error 03 becomes more visible in raw speed signal 04 due to the differentiation, so that the error has a more distinct effect.

Figure 3:
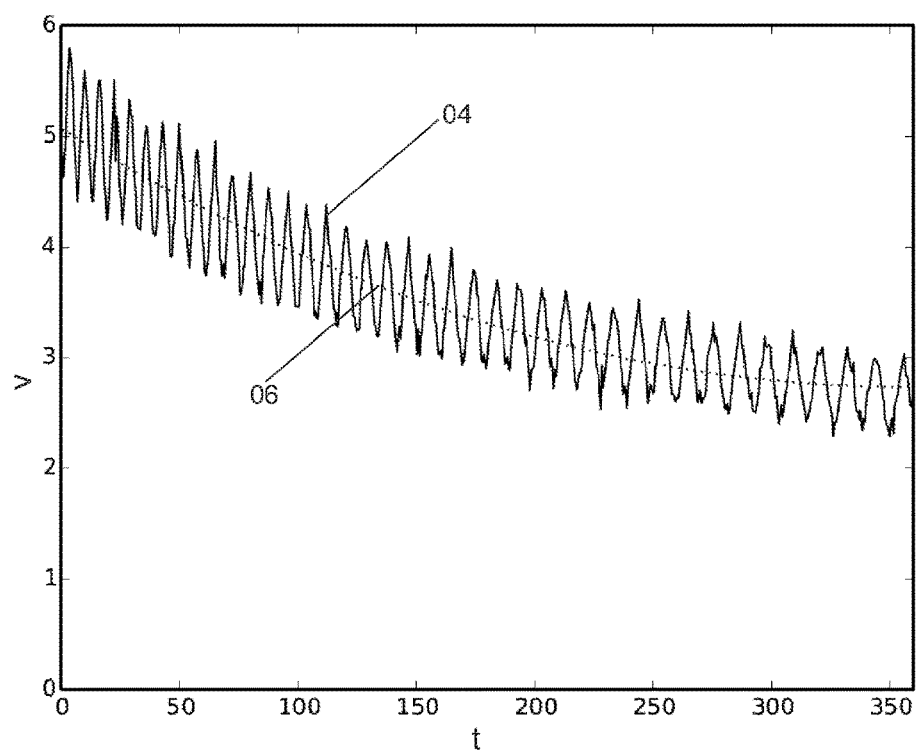
FIG. 3 shows a diagram including the raw speed signal curve during a speed change.

FIG. 3 shows how strong the amplification effect of the error in raw speed signal 04 is. Compared to actual speed 06 of the electric motor, an error of approximately ±10% occurs in the raw speed value derived from angle signal 01 of the commutation sensor. It is also apparent that the frequency of the disturbance waviness of raw speed signal 04 is a function of speed and consequently the ascertainment according to the present invention of the half period of raw speed signal 04 is preferably to be repeated again continuously for each pass of the method steps in order to achieve an optimum error correction.

Figure 4:
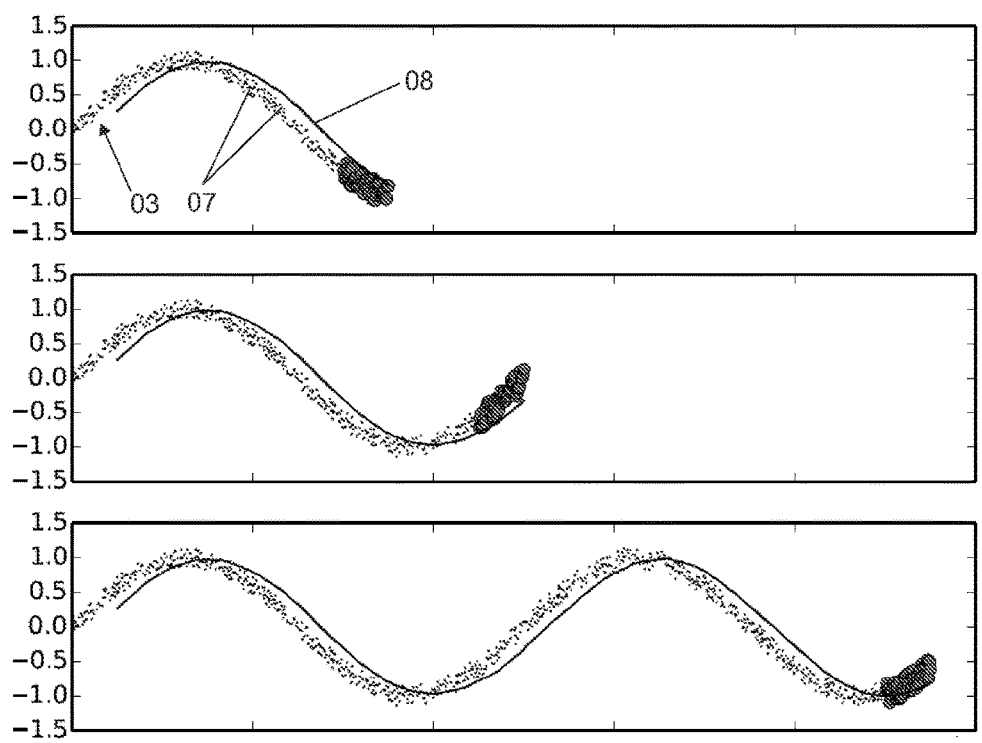
FIG. 4 shows three diagrams which show a sliding averaging according to the prior art in the signal curve of the angle error.

The three diagrams in FIG. 4 illustrate a method for correcting raw speed signal 04 via the moving average value based on the curve of angle error 03, which is made up of a plurality of samples 07, as is known from the prior art. The mean value formation here provides for a noise-free signal 08, which is represented by a continuous black line, while the disturbance waviness is, however, preserved.

Figure 5:
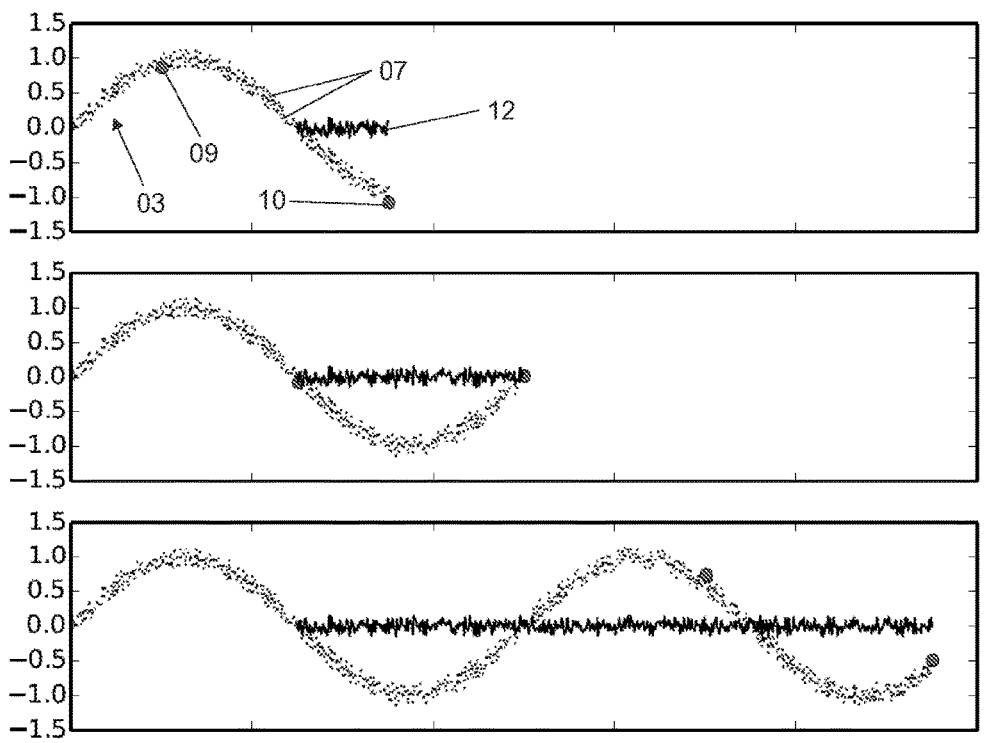
FIG. 5 shows three diagrams including an averaging across two samples of the angle error.

In contrast, the three diagrams in FIG. 5 show the curve of angle error 03, which according to the present invention, is averaged in each case via two samples 09 and 10, i.e., a sample pair, which lie exactly one half of a period duration of angle error 03 apart from one another. Result signal 12 of this averaging, which is shown here by a dark line, shows a perfect compensation of the disturbance waviness, while the noise is initially preserved nearly unchanged.

Figure 6:
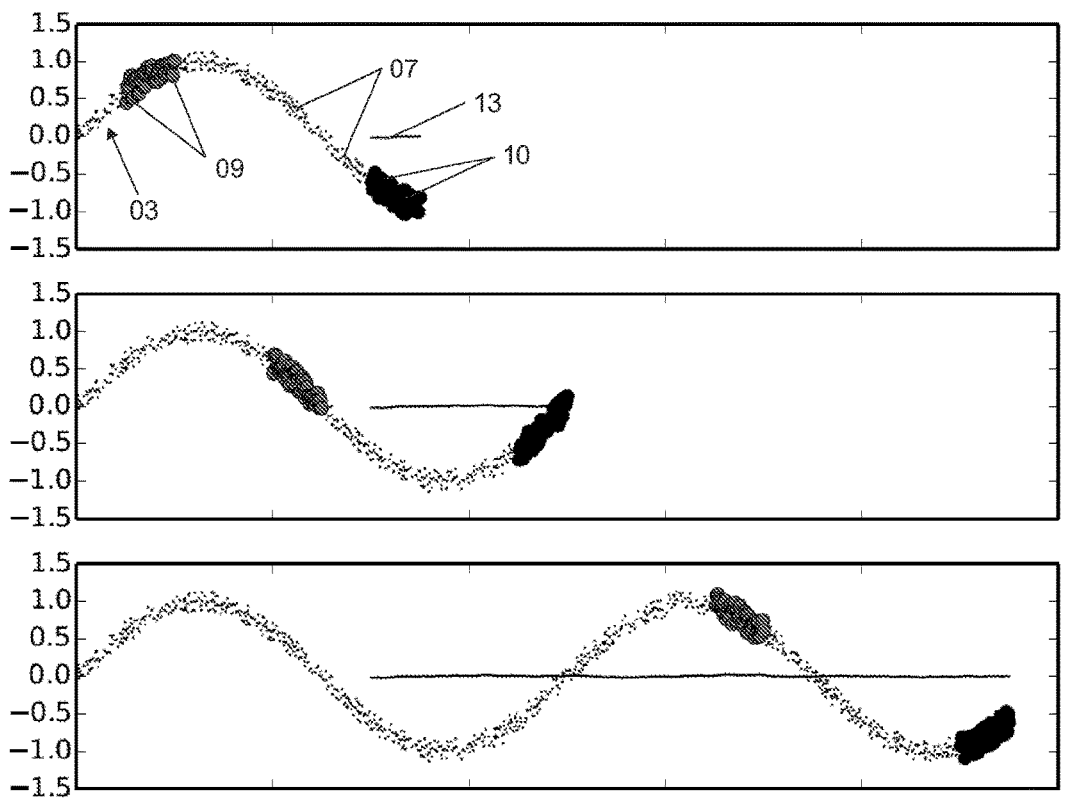
FIG. 6 shows three diagrams including an averaging of two average values.

In contrast to FIG. 5, FIG. 6 shows a preferred specific embodiment of the present invention in which two individual samples are not averaged, but instead two average values are used, in each case more than n, preferably n=10, samples 09 and 10, these having in turn a distance of half a period duration of angle error 03. In this method, a very well-smoothed signal 13, which has neither the noise component nor the disturbance waviness, is produced, which is represented by the continuous black line.

Figure 7:
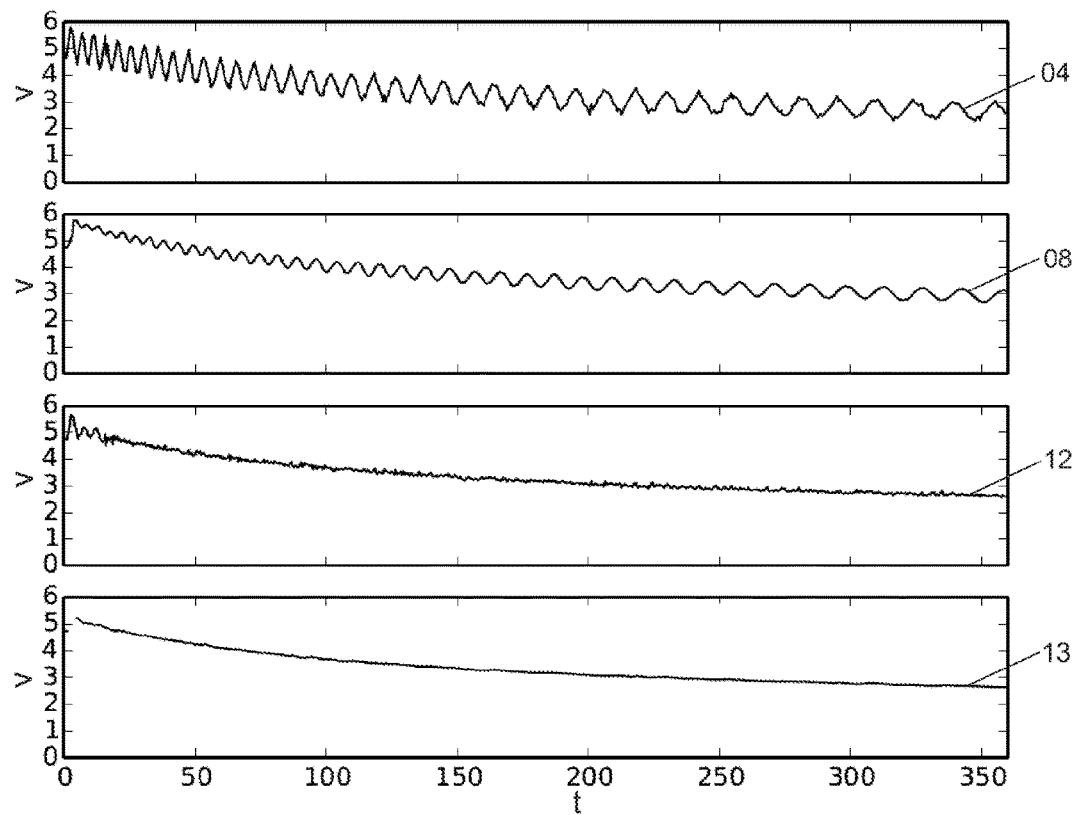
FIG. 7 shows four diagrams including a comparison of the methods shown in FIG. 4 through FIG. 6.

The comparison of the four diagrams in FIG. 7 illustrates the difference of the results of the methods shown in FIGS. 4 through 6 based on real speed signals detected by measurement. While the method of the moving average including sliding averaged signal 08 as a result only eliminates the noise component of raw speed signal 04, the averaging across two individual samples including noise-free signal 12 results in the elimination of the disturbance waviness of raw speed signal 04, and the averaging across n pairs of samples including smoothed signal 13 results in the removal of both the noise component and the disturbance waviness of the raw speed signal.

Furthermore, FIG. 7 shows that the time delay in the averaging across n pairs of samples 09 and 10 (T/2+n) is somewhat longer than in the averaging across two individual samples 09 and 10 (T/2), and significantly longer than in the case of the pure mean value formation (n), at least in the case of average values n selected in FIG. 7. If, however, it were attempted to achieve a comparably good signal using a method according to the prior art, the filter delay over time would have to be a multiple of the period duration of raw speed signal 04. However, if the delay constant is too great, raw speed signal 04 may no longer be used for dynamic reactions. Consequently, the speed-dependent averaging from two average values proposed by the present invention is also the most delay-optimal method.

Figure 8:
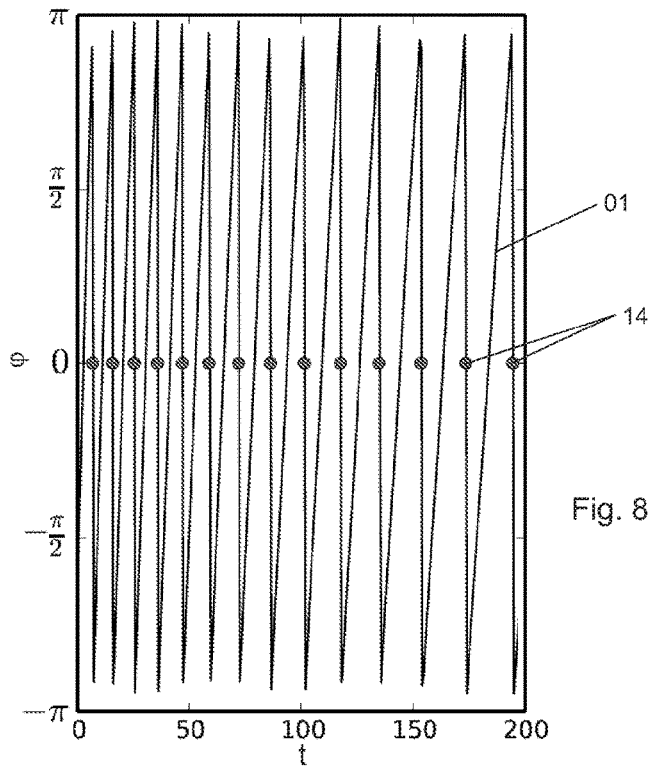
FIG. 8 shows a diagram including an angle signal curve.

FIG. 8 shows a diagram including an angle signal curve 01 according to the present invention of $-\pi$ to $+\pi$, the magnetic field angle being depicted as a function of time. Value range steps 14 from $+\pi$ to $-\pi$ are denoted by dots and mark the point in time at which the electric motor starts a new rotation. Accordingly, the distance between two value range steps 14 represents the period duration of angle signal 01. The speed and thus the period may be redetermined at each value range step 14 in order to ascertain from it the correct distance between samples 09 and 10 to be used for the average. It is also apparent from the curve that the speed change may be derived from angle signal 01.

REFERENCE NUMERALS 01 measured angle signal
02 ideal angle signal
03 angle error
04 raw speed signal
05—
06 actual speed
07 measured samples
08 sliding averaged signal
09 first samples of the pairs
10 second samples of the pairs
11—
12 noise-free signal
13 smoothed signal
14 value range step

What is claimed is:

1. A method for generating a speed signal of an electric motor, the electric motor including a commutation sensor, the method including the following steps:
    ascertaining a periodic angle signal of the electric motor with the aid of the commutation sensor, the angle signal being made up of a plurality of samples and an angle-dependent, periodic angle error;
    converting the angle signal into a raw speed signal, the raw speed signal due to the angle error having a disturbance waviness, a period duration of the disturbance waviness corresponding to a period duration of the angle error;
    ascertaining a half period duration of the raw speed signal periodized by the disturbance waviness;

averaging at least one pair of samples of the raw speed signal, each of the pair lying apart from one another by the ascertained half period duration of the raw speed signal, to obtain a mean value; and providing the obtained mean value as the speed signal.

2. The method as recited in claim 1 wherein the commutation sensor detects one period of the angle signal and two periods of the angle error during one complete rotation of the electric motor.

3. The method as recited in claim 1 wherein the half period duration of the raw speed signal is ascertained by ascertaining the duration between two directly successive value range steps of the angle signal.

4. The method as recited in claim 3 wherein a fourth of the duration between the two directly successive value range steps of the angle signal is used in order to obtain the half period duration of the raw speed signal.

5. The method as recited in claim 1 wherein the half period duration of the raw speed signal is ascertained by feeding back the speed signal provided repeatedly beforehand.

6. The method as recited in claim 1 wherein n>1 pairs of samples are averaged, the samples of each pair lying exactly one half of a period length of the raw speed signal apart from one another.

7. The method as recited in claim 6 wherein n>5 pairs of samples are averaged, the samples of each pair lying exactly one half of a period length of the raw speed signal apart from one another.

8. The method as recited in claim 6 wherein first samples of the pairs in each case and the second samples of the pairs in each case directly succeed one another.

9. A speed-regulatable electric motor system comprising a rotatory electric motor including a commutation sensor, and a regulating unit providing a speed signal of the electric motor and configured for generating the speed signal by carrying out the method as recited in claim 6.

* * * * *